UNITED STATES PATENT OFFICE.

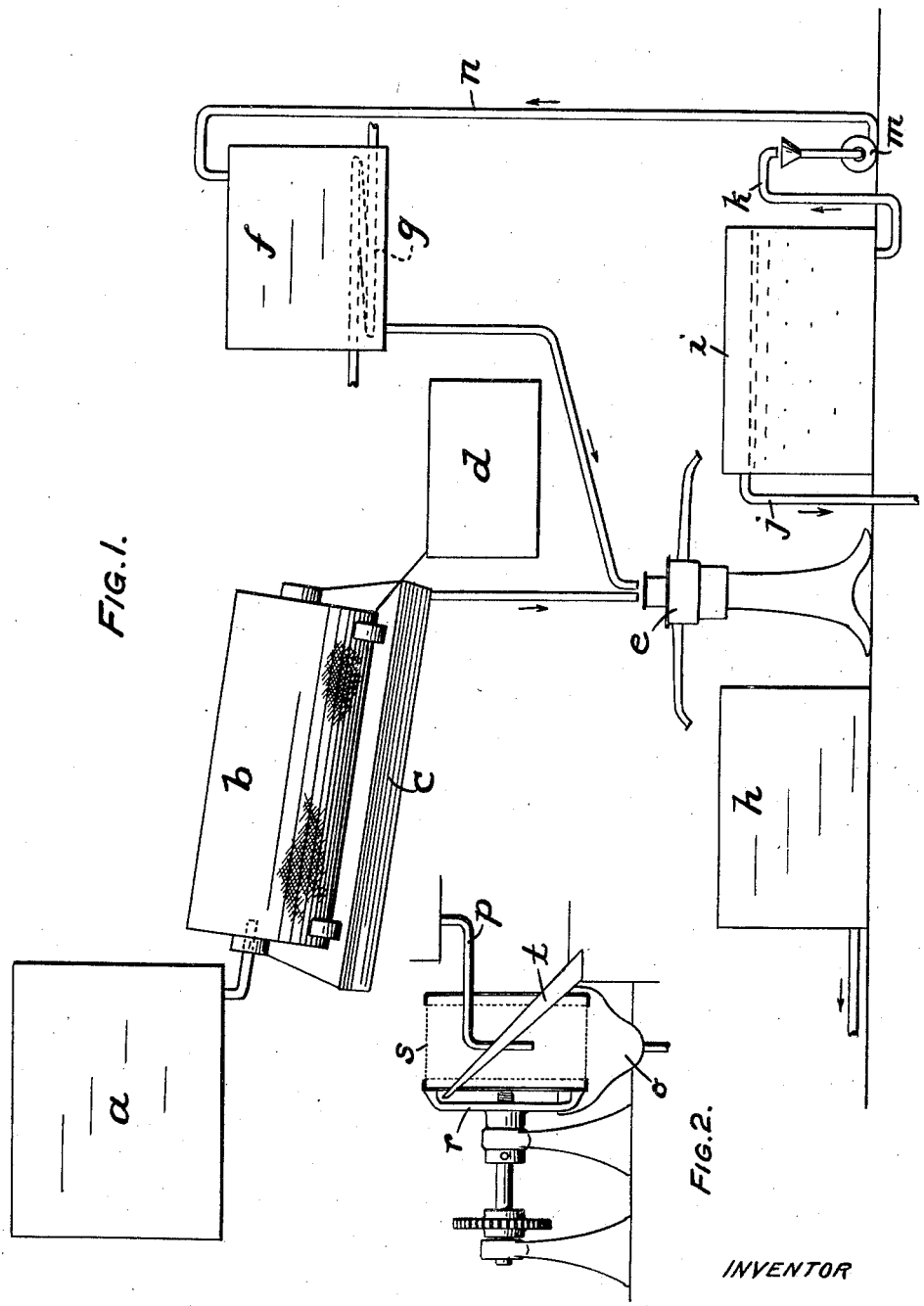

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

PROCESS OF SEPARATING OILS FROM FOOTS.

1,381,706.      Specification of Letters Patent.     Patented June 14, 1921.

Application filed May 24, 1920. Serial No. 383,665.

*To all whom it may concern:*

Be it known that I, CYRUS HOWARD HAPGOOD, a citizen of the United States, residing at Nutley, county of Essex, and State of New Jersey, have invented a new and useful Improvement in Processes of Separating Oils from Foots, of which the following is a full, clear, and exact description, reference being had to the accompanying drawings, which form a part of this specification.

In the separation of oils from foots, and particularly in the treatment of palm nuts, copra and cotton seed, it is customary to allow the husks and dirt to settle out in a series of settling operations. The settling method requires considerable time and the separation is far from complete and owing to the absence of a clean separation the oil frequently decomposes somewhat and becomes more or less rancid.

The object of my invention is to effect a more thorough separation of the contaminating solid ingredients of the oil and to accomplish that separation more expeditiously and economically than heretofore.

In my process I first remove a substantial proportion of the husks, heavier dirt, etc., by a filtering operation and then, by means of the joint action of centrifugal force and an added carrier or cushioning liquid, wash out the finer dirt, leaving the oil in a perfectly pure state.

The practice of my process is not dependent on the employment of any particular apparatus, but in the accompanying drawing Figure 1 is a diagram, in elevation, of one form of apparatus which may be effectively used to carry out the process and Fig. 2 is a side elevation, partly in section, of a modified filtering device.

From the tank $a$ the palm nut or other oil is fed into a rotary drum filter or screen $b$, the meshes of which are fine enough to prevent the passage through the screen of husks, shells or coarse dirt. The oil, together with fine dirt in suspension, passes through the screen into the trough $c$. The drum screen is of such length and arranged at such an angle to the horizontal that before the coarse solid particles reach the lower or discharge end, they are carried around and around a number of times and so agitated and subjected to such friction that they are almost entirely freed from oil adherent thereto, which oil drops down to the bottom of the screen and escapes therefrom into the trough. The separated coarser solids pass into a vat $d$.

The oil containing fine particles of husks, shells, dirt, etc., in suspension, flows from the trough $c$ into a centrifugal clarifying separator $e$. Simultaneously, a suitable cushioning or carrier liquid, heavier than the oil, is conveyed to the separator. The added liquid is preferably water and it is preferably heated to a temperature of about 140° F. so that the mixture of oil and water in the separator will be at such temperature as to allow the oil to flow freely. It is known to use water or any appropriate cushioning or carrier liquid to sludge out solids from liquids in a centrifugal operation. One example of such use is disclosed in the Beach Patent, No 1,158,959, issued November 2, 1915. The machine of the Beach patent is capable of use in my process, but I prefer to use a separator constructed substantially in accordance with the Snyder Patent, No. 1,283,343, issued October 28, 1919. In the drawing, $f$ is the water reservoir and $g$ a steam coil for heating the water therein.

In the centrifugal operation, the lighter ingredient, the oil, will be displaced inwardly and be discharged into a tank $h$. The water and the fine particles of foreign matter introduced with the oil will be forced against the periphery of the rotating bowl and outflow into a sludge tank $i$. The discharged water and fine solid particles carried off thereby may be allowed to run to waste, but I prefer to re-use the water in the centrifugal operation in order to save heat. In the sludge tank $i$ the water and foreign matter will tend to separate by gravity, the latter floating on the top, and being carried off, with some water, through an overflow pipe $j$. The purified water outflows at the bottom into a pipe $k$, which extends upward, its discharge end being slightly below the level of the sludge in the tank $i$. The principle of operation is the same as in the well known "Florence flask." The water outflowing from pipe $k$ discharges into a funnel and is thence, by means of a pump $m$, lifted through a pipe $n$ into the water supply tank $f$.

The oil discharged into the tank $h$ is so quickly and thoroughly purified that it may be kept for a long time at normal temperature without becoming rancid. The process is economical and commercially practicable because only the partially purified oil is subjected to the centrifugal operation, because it is necessary to centrifuge only oil from which the shells or husks and the heavier or coarser dirt have been preliminarily extracted, and because, owing to this circumstance and to the concurrent washing out of the centrifuge with water, the operation of the centrifuge may be practically continuous. Comparatively little oil is carried out of the screen into receptacle $d$, a small amount of heat is required to maintain the water at a proper temperature, and very little hand labor is required.

It is not necessary to filter or screen the oil in a device of the character shown in Fig. 1, as other screens or filters are available. A basket centrifuge is usable, but is not preferable owing to its tendency to clog and the necessity of frequently cleaning it out. In Fig. 2 I have shown a rotary drum or cylinder $r$ having a peripheral screen $s$, the mixture of oil and foots being introduced through a pipe $p$. Below the screen is a receptacle $o$ for the filtered or screened oil. An inclined trough $t$ extends through the drum, and the solid particles, lifted in the rotation of the drum, drop thereon and are carried out into a suitable receiver.

Having now fully described my invention, what I claim and desire to protect by Letters Patent is:

1. The process of separating foots from oil which comprises filtering out the coarser solid particles, heating a liquid of greater specific gravity than the oil, subjecting the partially purified oil and said heated liquid concurrently to the action of centrifugal force, separately discharging the oil from said liquid, whereby the latter will carry off the solid particles that have not been removed in the filtering step, separating said particles, with some of the heated liquid, from the remainder of the heated liquid, and re-using the purified liquid in the centrifugal oil separating and purifying operation.

2. The process of separating foots from oil which comprises subjecting the mixture to a simultaneous agitation and screening operation, subjecting the screened oil, together with a carrier liquid of greater specific gravity than the oil, to the action of centrifugal force, and separately discharging the oil and said liquid.

3. The process of separating foots from oil which comprises subjecting the mixture to a simultaneous agitation and screening operation, heating a liquid of greater specific gravity than the oil, and subjecting the screened oil and said heated liquid concurrently to the action of centrifugal force to separate the oil in a purified condition.

4. The process of separating foots from oil which comprises subjecting the mixture to a simultaneous agitation and screening operation, heating a liquid of greater specific gravity than the oil, subjecting the screened oil and said heated liquid concurrently to the action of centrifugal force and separately discharging the purified oil and the liquid, the latter carrying off solid particles that have not been removed in the agitation and screening step, separating said solids, with some of the heated liquid, from the remainder of the latter, and re-using the thus purified liquid in the oil centrifugal separating and purifying operation.

In testimony of which invention, I have hereunto set my hand, at city of New York, on this 21st day of May, 1920.

CYRUS HOWARD HAPGOOD.